(12) United States Patent
Hsieh et al.

(10) Patent No.: US 7,316,567 B2
(45) Date of Patent: Jan. 8, 2008

(54) PHYSICAL PROGRAMMING TOY

(76) Inventors: Jennifer Chia-Jen Hsieh, 467 Archcove Ct., San Jose, CA (US) 95111; Eric Gunghua Liang, 2119 Winterwood Dr., Fullerton, CA (US) 92833; Elizabeth Yin, 547 Sullivan Dr., Mountain View, CA (US) 94041

( * ) Notice: Subject to any disclaimer, the term of this patent is extended or adjusted under 35 U.S.C. 154(b) by 797 days.

(21) Appl. No.: 10/631,259

(22) Filed: Aug. 1, 2003

(65) Prior Publication Data

US 2005/0026537 A1 Feb. 3, 2005

(51) Int. Cl.
*A63H 33/04* (2006.01)
(52) U.S. Cl. .................... 434/171; 446/91; 700/245
(58) Field of Classification Search ............... 434/171; 446/91; 700/245; 901/3
See application file for complete search history.

(56) References Cited

OTHER PUBLICATIONS

Article entitled: "Task Blocks: Tangible Interfaces for Creative Exploration" by Michael Terry of Everyday Computing Lab, GVU Center, College of Computing, Georgia Institute of Technology, Atlanta, GA, posted at http://www.cc.gatech.edu/fce/ecl/projects/openEnded/pubs/taskBlocks-chi2001.pdf, 2001.
Article entitled: "Tangible Computation Bricks: Building-Blocks for Physical Microworlds" by Timothy S. McNerney of the MIT Media Lab, posted at http://xenia.media.mit.edu/~mcnerney/tangible-comp-bricks-review2.2.pdf, Sep. 11, 2000.
Article entitled: "Mini-Languages: a way to learn programming principles" by Peter Brusilovsky et al., *Education and Information Technologies*, 2 65-83, 1997.
3 print outs from the web regarding the Lego Mindstorms product, entitled: "The RCX", "Product Details" and "Software", 2000.
Print out from the web regarding the Lego MyBot, entitled: "Jan. 24, 2001 Press Release".
Print out from the web regarding he Lego MyBot, entitled: "Tech-Teaching Toys Woo Smart Kids", Jul. 15, 2000.
Print out from the web regarding the Lego MyBot, entitled: "Aug. 31, 2000 Press Release".
Print out from the web regarding the Lego MyBot, entitled: "Project #2: Naturalistic Observations", Feb. 19, 2001.
Print out from the web regarding the Lego MyBot, entitled: "Raving Toy Maniac: Lego MyBot Helps Kids Learn High Tech", Jul. 13, 2003.

*Primary Examiner*—Robert E. Pezzuto
*Assistant Examiner*—Cameron Saadat

(57) ABSTRACT

A toy for teaching the logical thought process of computer programming has a plurality of stackable blocks with each block having a memory for the storage of at least one computer programming instruction. When the plurality of stackable blocks are mechanically stacked, a plurality of instructions are electrically connected forming a computer program. A main block is configured so that the plurality of stackable blocks can be mechanically stacked on the main block. A computer is electrically connected to receive the computer program. A robot is connected to the computer, with the computer controlling the robot in response to the computer program.

17 Claims, 5 Drawing Sheets

PHYSICAL PROGRAMMING TOY

TECHNICAL FIELD

The present invention relates to an electronic educational toy that teaches the logic of programming without requiring an understanding of other concepts typically involved in programming, such as memory allocation, syntax, and compiler errors, which commonly frustrates the process of learning programming.

BACKGROUND OF THE INVENTION

Computer programming is an essential skill for engineers and becoming important for non-engineers, as well, in our rapidly developing modem technological society. As technology increases in complexity the demand for those with programming skills will increase. This places a need to educate and train students the "logic" of programming.

Heretofore, computer programming has been taught much as a new language is taught. As with any language, the syntax of the language is important in conveying meaning. Thus, in the English language (and other languages), the first letter of the first word in a sentence is capitalized. Further, a "period" ends a sentence. A "comma" separates phrases, and a "semi-colon" separates clauses. However, because human languages are used to convey information from one human to another, syntax errors may be forgiven with the reader still able to understand the meaning of the writing. A writing may still effectively "convey" the message to a reader despite syntactical or grammatical errors.

However, with computer programming, one communicates with a computer or a machine, which is very unforgiving. Any error in syntax will be met by the compiler issuing the dreaded "syntax error" with the machine giving the programmer sparse details of the location of the error and what the error is. It is only after all the syntax errors, memory allocation errors, etc. are resolved that the computer would even attempt to understand the content or the logic of the program. This is a deterrent to learning the logical thinking aspect of programming.

In an article entitled: "Task Blocks: Tangible Interfaces for Creative Exploration" by Michael Terry of Everyday Computing Lab, GVU Center, College of Computing, Georgia Institute of Technology, Atlanta, Ga., posted at http://www.cc.gatech.edu/fce/ecl/projects/openEnded/pubs/task-Blocks-chi2001.pdf, the author suggests using Task Blocks that use physical blocks to represent computational functions. The user can string Task Blocks together to create a "pipeline" that sequentially manipulates data. The author does not describe in detail the structure of each Task Block but the description suggests that each Task Block is a computational device. In addition, each Task Block can be attached to a control block to vary the effect of each individual Task Block in the pipeline, further supporting the conclusion that each Task Block is a computational device. The use of physical computational devices that are connected together is expensive and complex.

In an article entitled: "Tangible Computation Bricks: Building-Blocks for Physical Microworlds" by Timothy S. McNerney of the MIT Media Lab, posted at http://xenia.media.mit.edu/~mcnerney/tangible-comp-bricks-review2.2.pdf, the author suggests using Lego parts each embedded with a microprocessor (called Bricks). Further, each such Brick has an ISO "smart card" connector on the top and bottom that allows communication with other Bricks. In addition, the use of a microprocessor in the Brick allows the user to "get under the hood" to reprogram a Brick if the correct "behavior" is not available in that Brick. Finally, each of the Bricks does not permit any branching activity. The use of a microprocessor in each Brick is expensive and allowing users to "get under the hood" results in a complex design. Further, since one must know how to "program" the Brick to be able to "get under the hood", the toy is clearly not a toy designed to teach programming. Further, having a separate "smart card" connector in addition to the mechanical connector results in difficulty in stacking. Finally, not having branching capability is a self-evident drawback.

Stacking block products such as Lego are well known in the art. Lego has produced a toy (called Lego Mindstorms) that consists of stacking blocks, in which one of the blocks contains a microprocessor, which can be programmed to control sensors and motors connected to other blocks. However, the microprocessor in the Lego Mindstorms toy must be programmed by a separate computer, requiring one to input code. This leads back to the requirement of leaning programming in order to program the Lego Mindstorms product.

Finally, in the fall of 2000, Lego introduced a product called the MyBot. The core of the product is a microcomputer that contains technology developed in consultation with MIT. The microcomputer is programmed by attaching a combination of "smart bricks." Depending on the "smart" activity and the identity of the bricks selected, the creation exhibits its own distinctive behavior. This appears to be a version of the "Computation Brick" developed at MIT described heretofore, and would have the same limitations and deficiencies previously discussed. Further, it appears that the MyBot products is no longer on the market. It appears that ultimately this product was not intended to teach programming, but merely to stimulate very young children with the different combinations of actions possible in using MyBot.

Thus, the present invention solves the foregoing problem and seeks to teach the logic of programming without requiring the user to learn the syntax of programming through an inexpensive, fun and hands-on toy.

SUMMARY OF THE INVENTION

Accordingly, in the present invention, a toy comprises a plurality of stackable blocks, with each block having a memory for storage of at least one computer program instruction. When the plurality of blocks are mechanically stacked, a plurality of instructions are electrically connected forming a computer program. The toy further comprises a computer which is electrically connected to receive computer program. Finally a robot is connected to the computer, with the computer controlling the robot in response to the computer program. The present invention also relates to a stackable block having a memory for storing at least one computer program instruction for use in such a toy. Finally, the present invention relates to a block containing a computer for use in such a toy.

DETAILED DESCRIPTION OF THE PREFERRED EMBODIMENTS

Figure 1:
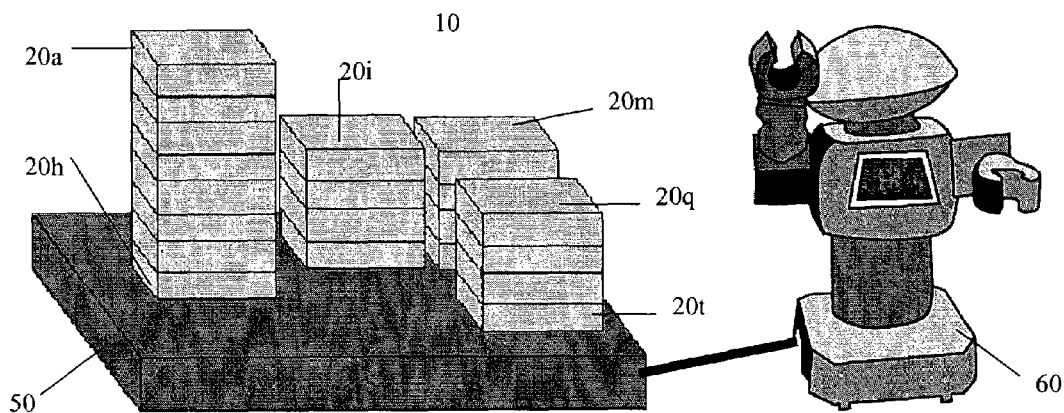
FIG. 1 is a perspective view of the toy of the present invention, showing a plurality of stacked blocks on a main block attached to a robot.

Referring to FIG. 1, there is shown a perspective view of a toy 10 of the present invention. The toy 10 comprises a plurality of groups of stackable blocks 20(a-h), 20(i-l), 20(m-p) and 20(q-t). Each group comprises one or more of stackable blocks 20. As will be described hereinafter, each stackable block 20 has a memory for storage of one or more computer program instructions. The instructions may be binary executable instructions or they may be high order language source code instruction. Because the computer program instruction in each block 20 is made by the manufacturer of the toy 10, they have already been "debugged," meaning the syntax required is included. This makes any combination of connected blocks executable. Thus, the user of the toy 10 needs to be concerned only with the logic of stacking the different blocks 20 to form the desired computer program. Each block 20, also has an indicia, such as color, or words to indicate the type of computer program instruction that is contained therein. When the stackable blocks 20 are mechanically grouped or stacked, the group of stackable blocks, e.g. group 20(a-h), constitutes one group of computer program instructions, which may be in the nature of a subroutine or a computer "object." As is understood by those skilled in the computer programming art, execution of a computer program is sequential in nature. Thus, the stacking of the plurality of blocks 20 by the user indicates that the execution of the computer program instructions contained in those blocks commences from the top most block 20 to the bottom most block 20 connected to the main block 56. Collectively, the plurality of groups of computer program instructions 20(a-h), 20(i-l), 20(m-p), and 20(q-t) form a computer program.

The plurality of groups of stackable blocks 20(a-h), 20(i-l), 20(m-p) and 20(q-t) are mechanically stacked on a main block 50. The main block 50 is connected to a robot 60. A computer 52, which may be located in either the main block 50 or in the robot 60, receives the computer program from the plurality of blocks 20. If the set of instructions contained in the blocks 20 are of a high order language, such as source code, then the computer 52 has an associated compiler or interpreter needs to compile or interpret the computer program, prior to execution. After compilation or interpretation, the computer 52 controls the robot 60. Thus, the robot 60 responds to the plurality of computer program instructions that are contained in the plurality of stackable blocks 20. The computer program from the plurality of blocks 20 can also be executable code. In that event, the computer 52 merely runs the executable code of the computer program, without any compilation or interpretation.

Figure 2:
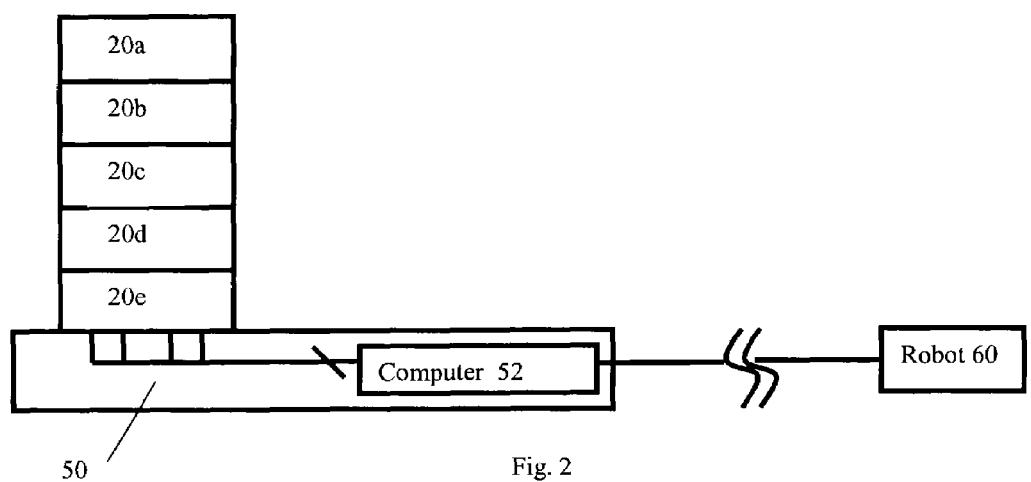
FIG. 2 is a schematic circuit diagram of one embodiment of the toy of the present invention, showing the electrical connection of a plurality of stackable blocks to the computer to the robot.

Referring to FIG. 2, there is shown a schematic circuit diagram of one embodiment of the toy 10 of the present invention. As shown in FIG. 2, a group of stackable blocks 20(a-e) are mechanically stacked to one another to form a computer program. The group of blocks 20(a-e) are stacked on the main block 50. A computer 52 is located in the main block 50. The computer 52 receives the plurality of computer instructions from the plurality of blocks 20(a-e). The computer 52 is connected to the robot 60. The computer 52 controls the robot 60 in response to the plurality of computer program instructions from the plurality of blocks 20(a-e). The computer 52 is electrically connected to receive the plurality of computer program instructions. The computer 52 however, can control the operation of the robot 60 either by an electrical bus which tethers the computer computer 52 to the robot 60 or the computer computer 52 can also control the robot wirelessly. As used herein, the term "robot" can mean any electromechanical or electronic device that responds to the control signals from the computer 52. Thus, the robot 60 can be a "humanoid" like mechanical device, as shown in FIG. 1 in which the arms and legs of the humanoid like device moves in responds to the control signals from the computer 52. Alternatively, the robot 60 can be radio controlled boat, car or plane, or it may even be a display device, or other electronic device. It is desired that the robot 60 have features that enable it to act in manner which is either visible or audible or any other way perceptible to the user in respond to the computer program instruction. Thus, the user who "programmed" the toy 10 by stacking the appropriate blocks 20 can receive feedback therefrom, thereby learning the cause and effect of the order of the blocks, the logic of programming.

Figure 3:
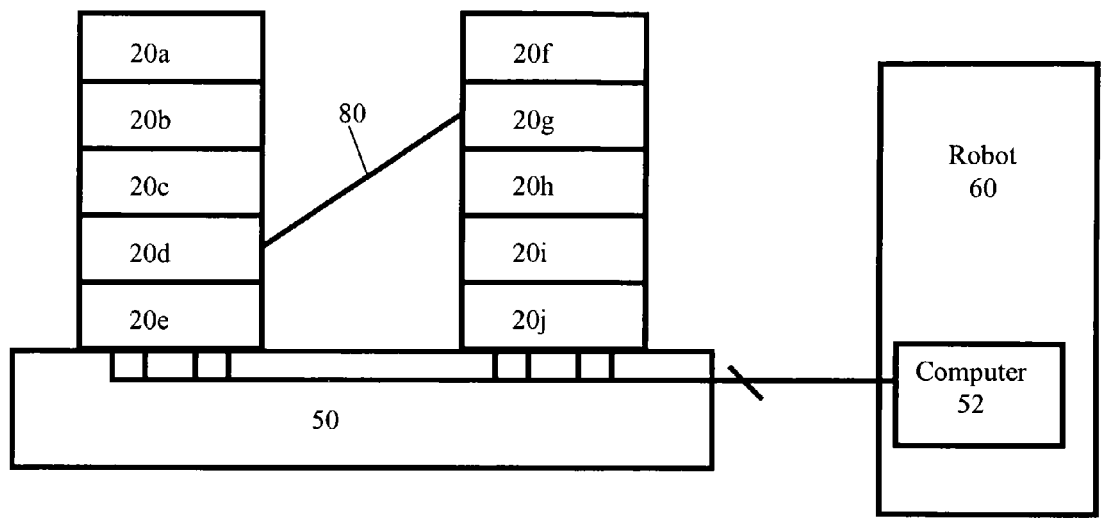
FIG. 3 is a schematic circuit diagram of another embodiment of the toy of the present invention, showing the electrical connection of a plurality of stackable blocks to the computer to the robot.

Referring to FIG. 3 there is shown another embodiment of the toy 10 of the present invention. In this embodiment, the computer computer 52 is located in the robot 60. Thus, the main block 50 serves only as a mechanical platform to mount the plurality of blocks 20. The plurality of instructions from the plurality of blocks 20 on the main block 50 are simply transferred to the memory within the computer 52, for execution. Similar to the embodiment shown in FIG. 2, this transfer can occur either through an electrical bus, or wirelessly. Further, even if the connection between the plurality of blocks 20 and the computer computer 52 is via a wire or a bus, the connection can be removed once all of the computer program instructions from the plurality of blocks are "loaded" into the computer 52. There are two groups of blocks 20 shown: blocks 20(a-e) and blocks 20(f-j). In addition, an electrical connection 80 connects block 20d to block 20g. In computer programming, instructions are provided which cause the execution of an otherwise sequential program to proceed to a branched instruction. Examples of these types of instructions include conditional branch statement or unconditional branch statement. Thus, depending upon the instruction contained in the block 20d or 20g, one of which may be either a conditional branch statement or an unconditional branch statement branching to the other instruction.

Figure 4:
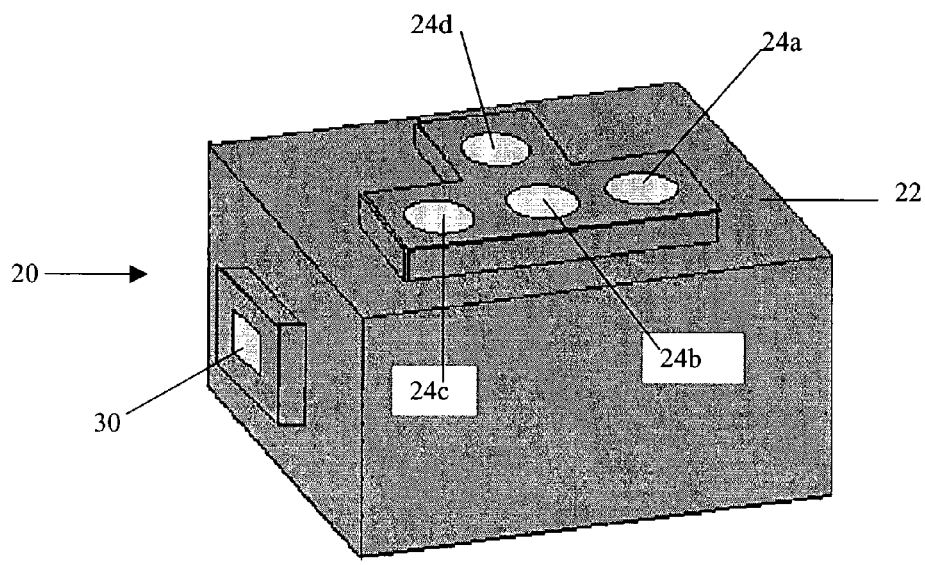
FIG. 4 is a top perspective view of a stackable block of the present invention, showing the protrusions of the block.
Figure 5:
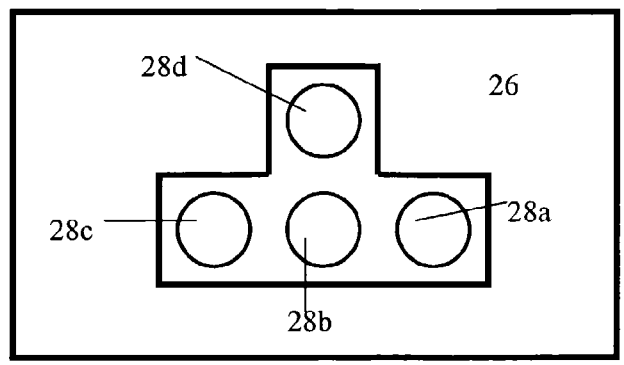
FIG. 5 is a bottom view of a stackable block of the present invention showing the receptacles of the block.

Referring to FIG. 4 there is shown a perspective view of one embodiment of a stackable block 20 of the present invention. The block 20 is substantially rectilinearly shaped, and has a first surface 22 from which a plurality of protrusions 24(a-d) are formed. Although four protrusions are shown in FIG. 4, the invention is not so limited and any number can be used, so long as they satisfy the electrical characteristics for connectivity between the blocks 20 (discussed hereinafter). Each block 20 in the preferred embodiment is made of injection molding plastic. As shown in FIG. 5, along a second surface 26 substantially opposite the first surface 22 is a plurality of receptacles 28(a-d). Again, although only four receptacles are shown, the invention is not so limited. The plurality of protrusions 24 and the plurality of receptacles 28 are asymmetrically shaped. By that it is meant that there is only position in which the protrusions 24 of a first block 20 can be stacked to (fitted into the receptacles 28 of) another block 20. This assures the electrical connection of one block 20 to another block 20 is correct. Each protrusion 24 is substantially cylindrically shaped, although any shape may be used so long as the receptacle 28 into which each protrusion 24 fits is similarly shaped. Each block 20 also comprises a port 30 to receive the (un)conditional branching from another block 20 as discussed previously.

Figure 6:
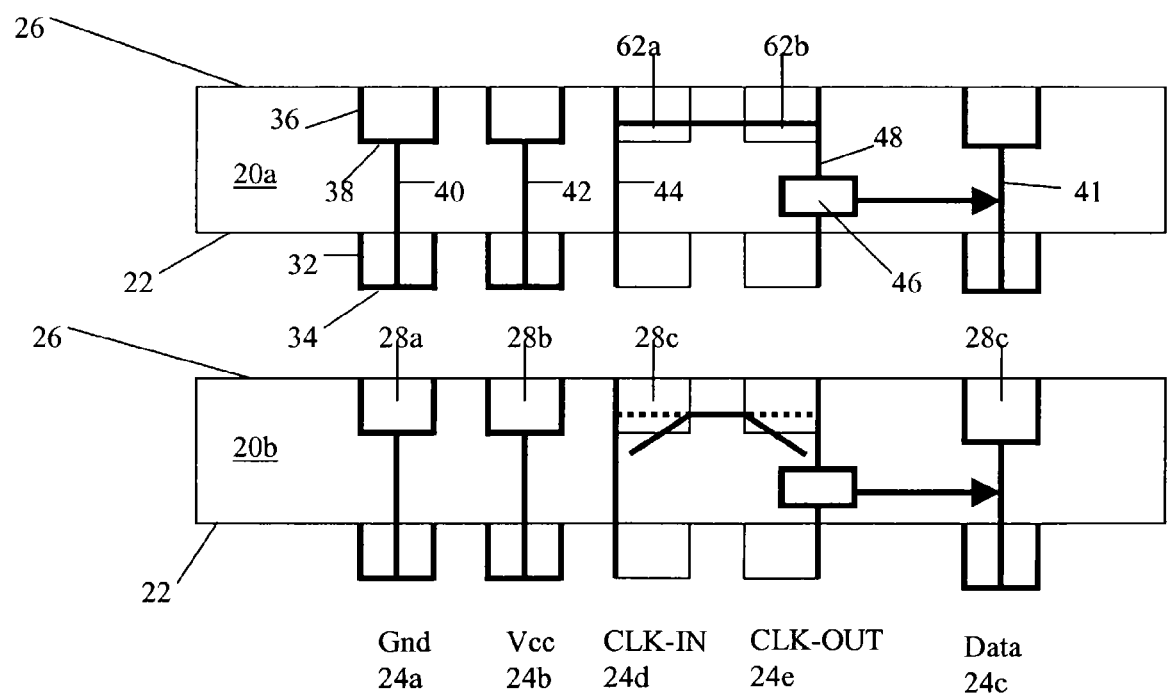
FIG. 6 is a schematic circuit diagram of one embodiment of the stackable block of the present invention showing the electrical connection of one stackable block to another, when the blocks are mechanically stacked.

Referring to FIG. 6 there is shown one embodiment of the stacking of one block 20a to another block 20b and the formation of the electrical connectivity thereby. The "dark" lines in the drawing indicate an electrically conductive element. Thus, each protrusion 24a, 24b and 24c is coated with a conductive element, along its exterior planar circularly shaped top 34 and along its exterior cylindrical surface 32. Each receptacle 28a, 28b, and 28c is also coated with a conductive element, along the exterior planar circularly shaped top 38 and along its exterior cylindrical surface 36. The conductive coating, i.e. 36 and 38, along the receptacle 28a is electrically connected via a connection 40 internal to the block 20a, to the conductive coating, i.e. 32 and 34, along the protrusion 24a. Thus when the protrusion 24a of block 20a is inserted into the receptacle 28a of block 20b, electrical connection is made between block 20a and block 20b through their respective protrusion 24a/receptacle 28a. Similarly, the protrusion 24b is connected to the receptacle 28b by an internal connection 42. Finally, the protrusion 24c is connected to the receptacle 28c by an internal connection 41. Thus, when the protrusion 24b of block 20a is inserted into the receptacle 28b of block 20b, electrical connection is made between block 20a and block 20b through their respective protrusion 24b/receptacle 28b. Finally, when protrusion 24c of block 20a is inserted into the receptacle 28c of block 20b, electrical connection is made between block 20a and block 20b through their respective protrusion 24c/receptacle 28c. In the preferred embodiment, protrusion 24a/receptacle 28a supplies ground, protrusion 24b/receptacle 28b supplies Vcc or power, and protrusion 24c/receptacle 28c supplies data. The blocks 20a and 20b are configured to "face down." Therefore, in the event block 20b is the lower most block 20 of a stack of computer program instructions, the protrusions 24 of block 20b would fit into receptacles 28 in the main block 50.

With respect to the protrusion 24d, it also has a conductive element but only along a portion of the exterior of the cylindrical surface 32. A similar portion of the exterior of the cylindrical surface 36 of a receptacle 28d is lined with a conductive element. An electrical connection 44 connects surface 36 with a portion of surface 32. Protrusion 24d/receptacle 28d serves to receive the CLK-IN signal.

With respect to the protrusion 24e, it also has a conductive element but only along a portion of the exterior of the cylindrical surface 32. A similar portion of the exterior of the cylindrical surface 36 of a receptacle 28e is lined with a conductive element. An electrical connection 48 connects surface 36 to a memory 46, which is then electrically connected to a portion of surface 32. Protrusion 24e/receptacle 28e serves to output the CLK-OUT signal.

Finally, two switches 62a and 62b located in the receptacles 24d and 24e, respectively connecting the connection 44 with the connection 48. In normal operation (as shown in block 20a), the switches 62a and 62b are closed, thereby connecting connection 44 with connection 48. However, when the protrusions 24d and 24e are inserted into the receptacles 28d and 28e, respectively, they "break" the electrical connection (as shown in block 20b) between connection 44 and connection 48. However, when the protrusions 24d and 24e are inserted into the receptacles 28d and 28e, respectively, they make the connection to the electrical connection 44 and 48, respectively of the adjoining block 20. Therefore, as can be seen from FIG. 6, since block 20b is not the uppermost block 20, the insertion of the protrusions 24d and 24e of block 20a into the receptacles 28d and 28e respectively of block 20b causes the switches 62a and 62b to break the connection between 44 and 48. In contrast, because the block 20a is the uppermost block 20 of a stack, the switches 62a and 62b remain closed connecting 44 to 48. The protrusion 24d receives a clock-in signal while the protrusion 24e provides a clock-out signal.

In operation, as a clock signal is provided to the protrusion 24d of block 20b, it travels along the connection 44 to the top most block 20a, and to the switches 62a and 62b to the connection 48. The clock signal enters into the memory 46 of block 20a and clocks out the instruction stored. The program instruction(s) clocked out of memory 46 of block 20a is supplied to the connection 41 and to the protrusion 24c of block 20a and then into block 20b and to protrusion 24c of block 20b. Thus, the data from the memory 46 of the top most block 20a is first supplied to the protrusion 24c of block 20b. The clock signal then is supplied to the block 20b where it is supplied to the memory 46 of block 20b. The computer program instruction(s) from block 20b is then read out and supplied to the protrusion 24c and into the computer 52. This continues until all the data from all the memory 46 are read out. This mirrors the intent of the user in placing the top most block as containing the first instruction to be executed.

The memory 46 can be any type of non-volatile memory, such as ROM, PROM, flash EEPROM or EPROM or FRAM. In the preferred embodiment, the memory 46 is of a serial type, e.g. SST25VF512 available from Silicon Storage Technology Inc. of Sunnyvale, Calif., such that bits of instructions are serially clocked out, in response to clock signals. Because the typical storage capacity of non-volatile memory storage exceeds one computer program instruction, each block may contain a plurality of instructions, or even an entire subroutine. In addition, to thwart competitors who might supply only additional blocks 20 to an existing user of the toy 10, each block 20 may also contain a copyrighted work, such as a poem, which needs to be verified by the computer computer 52 before the instruction in the block 20 can be executed. A would be competitor that supplies only compatible blocks 20 must have an identical copyrighted work to be compatible with the toy 10. The "copying" of such copyrighted work would constitute copyright infringement.

Figure 7:
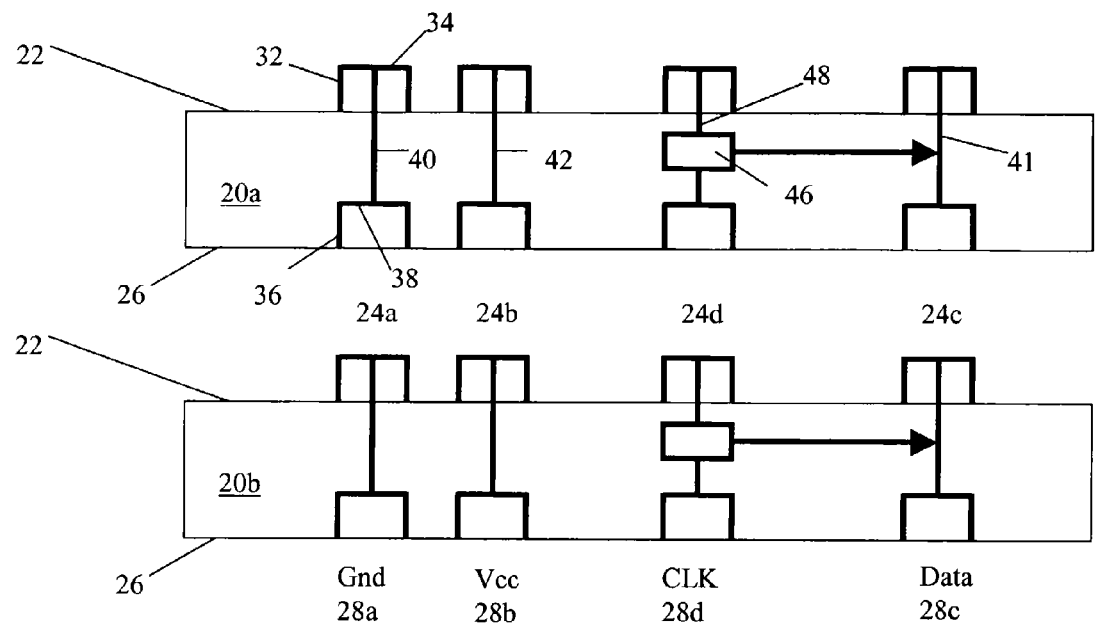
FIG. 7 is a schematic circuit diagram of another embodiment of the stackable block of the present invention showing the electrical connection of one stackable block to another, when the blocks are mechanically stacked.

Referring to FIG. 7 there is shown another embodiment of the stacking of one block 20a to another block 20b and the formation of the electrical connectivity thereby. Again, the "dark" lines in the drawing indicate an electrically conductive element. The electrical connection for a protrusion 24a/receptacle 28a, protrusion 24b/receptacle 28b, and protrusion 24c/receptacle 28c is identical to the description for the embodiment shown in FIG. 6. In the embodiment shown in FIG. 7, the connection of the blocks to the main block 50 is of the "face up" type. Thus, the lower most block 20, e.g. block 20b would have its receptacles 28 mate onto the protrusions 24 of the main block 50. Similar to the description for the embodiment shown in FIG. 6, the protrusion 24a/receptacle 28a is for ground, protrusion 24b/receptacle 28b supplies power or Vcc, and protrusion 24c/receptacle 28c supplies data. Finally, the protrusion 24d of block 20b fits into the receptacle 28d of block 20a. Between the protrusion 24d of a block 20 and its receptacle 28d is a connection 48 connecting to a memory 46.

The insertion of protrusion 24a of block 20b into receptacle 28a of block 20a forms an electrical connection between receptacle 28a of block 20b and protrusion 24a of block 20a. Further, the insertion of protrusion 24b of block 20b into receptacle 28b of block 20a forms an electrical connection between receptacle 28b of block 20b and protrusion 24b of block 20a. The insertion of protrusion 24c of block 20b into receptacle 28c of block 20a forms an electrical connection between receptacle 28c of block 20b and protrusion 24c of block 20a. Finally, the insertion of protrusion 24d of block 20b into receptacle 28d of block 20a forms an electrical connection between receptacle 28d of block 20b through memories 46 of blocks 20b and 20a and then to the protrusion 24d of block 20a.

In operation of the blocks shown in FIG. 7, the clock signal is first supplied to the receptacle 28d of block 20b. The clock signal is then supplied to the memory 46 of block 20b where the program instruction stored therein is clocked out and supplied to the data bus 41, where it is supplied to the receptacle 28c of block 20b. After the program instruction is clocked out from the memory 46 of block 20b, the clock signal is supplied to block 20a where it clocks out the program instruction stored in the memory 46 of block 20a. Thus, in the embodiment shown in FIG. 7, the program instruction from the lower most block is first clocked out or read, with the program instruction from the top most block being the last to be read. The program instructions read from the blocks 20a and 20b are supplied the computer 52. As is well known, computers 52, such as an embedded microcomputer usually has a CPU and a memory associated therewith. Thus, the instructions will be loaded into the embedded memory associated with the microcomputer computer 52 where the microcomputer computer 52 would execute the last instruction first received from the blocks 20a and 20b. In this manner, the instructions would again be executed from the top most block 20a down to the lower most block 20b.

Figure 8:
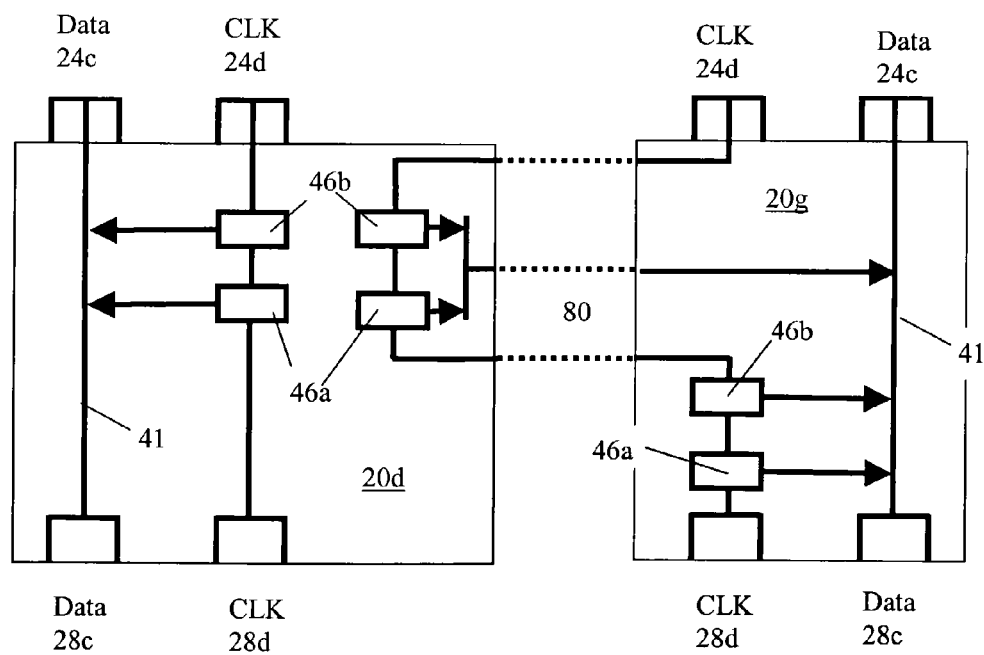
FIG. 8 is a schematic circuit diagram showing one embodiment of the electrical connection of one block containing a (un)conditional branch instruction to another block.

Referring to FIG. 8 there is shown one embodiment of the electrical connection between one block 20g containing an (un)conditional branch instruction, to another block 20d. As previously described with respect to the embodiment shown in FIG. 3, computer program instructions may also contain one or more (un)conditional branching instructions, such that upon execution, the program may "jump" to a non-sequential instruction. Each block 20 has a port 30 for the connection to another block 20 from which or to which branching may occur. Assume that block 20g contains the (un)conditional branch instruction, and block 20d is the block to which execution would branch in the event the condition defined by the program instruction in block 20g is satisfied. Only two of the protrusions 24/receptacles 28 for each of the blocks 20d and 20g are shown. Further a connector connects port 30 of each of the blocks 20d and 20g.

Each of the memories 46 for each of the blocks 20d and 20g is divided into two parts: an identifier part 46a and an instruction part 46b. The identifier part 46a is similar to a program counter or address or a label. Thus, for example, in the following program, the identifier part would be the program number, such as "00001", "00002", "00003" etc. The instruction part would be "Statement 1", "Statement 2" "(un)conditional branch to 00002" etc.

00001 Statement 1
00002 Statement 2
00003 Statement 3
00004 (un)conditional branch to 00002.

The identifier part 46 in the following program would be the label: "LOOP"

Statement 1
LOOP Statement 2
Statement 3
(un)conditional branch to LOOP.

The embodiment shown in FIG. 8 is of the "face up" type as described previously. When a clock signal CLK is supplied to the receptacle 28d of block 20d, the CLK signal is sued to clock out the identifier from the memory 46a and the program instruction from memory 46b. The CLK signal is then passed to the block "above" block 20d, through protrusion 24d. When the CLK signal is supplied to the receptacle 28d of block 20g, it clocks out the identifier data from memory 46a and then the program instruction from memory 46b. Because the block 20g is connected to block 20d through port 30, the CLK signal is then received by block 20d, where the identifier information is clocked out of a duplicate memory 46a, and the program instruction is clocked out of a duplicate memory 46b. Thereafter, the CLK signal, is re-routed back to block 20g and out to the protrusion 24d to the block "above" block 20g. In this manner, the reading of the blocks of instructions would continue in a sequential manner from the stack having the block 20g.

Figure 9:
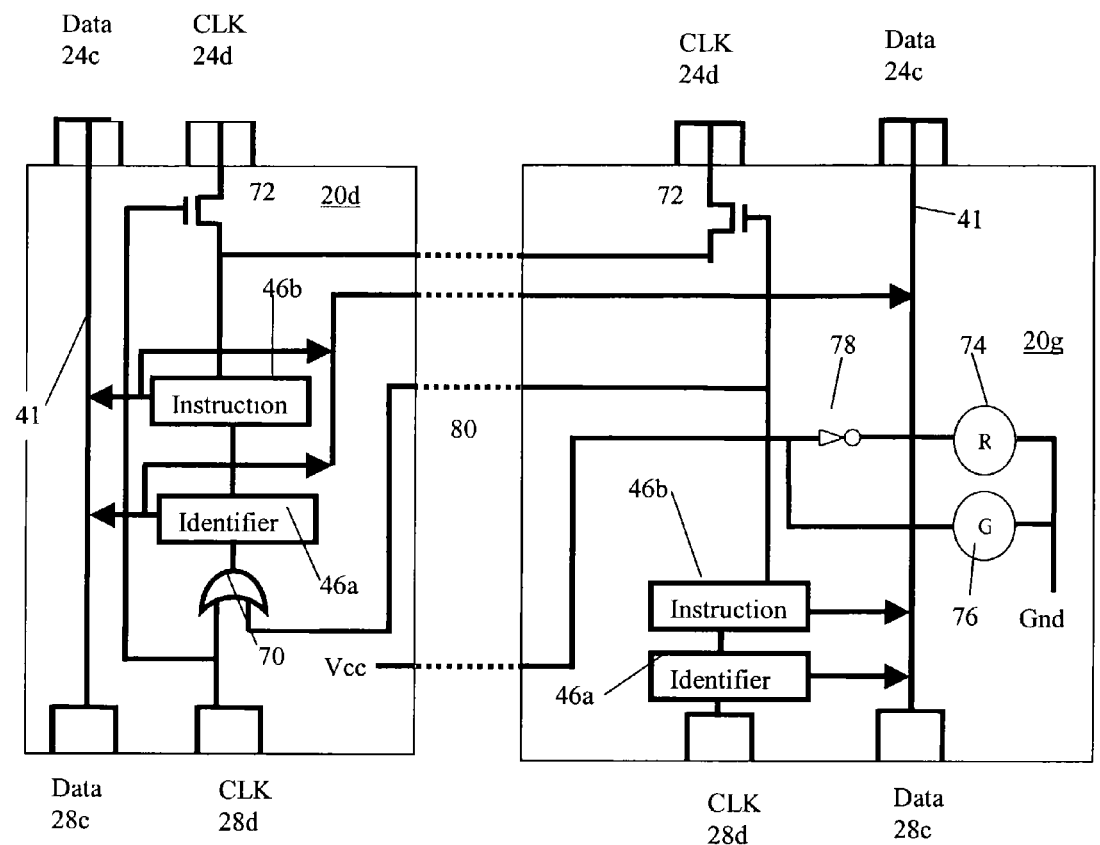
FIG. 9 is a schematic circuit diagram showing another embodiment of the electrical connection of one block containing an (un)conditional branch instruction to another block.

The disadvantage of the embodiment shown in FIG. 8 is that a duplicate set of memories 46a and 46b must be provided for each of the blocks containing a non-branching instruction. Referring to FIG. 9, there is shown another embodiment of the electrical connection between one block 20g containing an (un)conditional branch instruction, to another block 20d.

The block 20d, which contains the non-branching instruction comprises a receptacle 28d which receives the CLK signal. Thus the blocks 20d and 20g are of the "face up" type. The CLK signal is supplied to an input of an OR gate 70. The output of the OR gate 70 is supplied to the memory 46a which contains the identifier data. The data from the memory 46a is clocked out and is supplied to bus 41 of block 20d as well as to bus 41 of block 20g through a connection 80 between the blocks 20d and 20g. The CLK signal is also supplied to the memory 46b from which the program instruction is clocked out and is also supplied to the bus 41 of block 20d and block 20g through the connection 80. From the memory 46b the CLK signal is supplied to the source/drain of a N type transistor 72. The CLK signal from the receptacle 28d is supplied to the gate of transistor 72 of block 20d. The other source/drain of the N type transistor 72 is connected to the protrusion 24d of block 20d.

The block 20g, which contains the (un)conditional branching instruction comprises a receptacle 28d which receives the clock signal CLK. The CLK signal is supplied to the memory 46a where the identifier information is clocked out of the memory onto the bus 41 of the block 20g. The CLK signal is also supplied to the memory 46b which contains the (un)conditional branching instruction. From the memory 46b of block 20g, the CLK signal is supplied to the other input of the OR gate 70 of block 20d. Further, the CLK signal from the memory 46b is supplied to the gate of a N type transistor 72 of the block 20g. The source/drain of N type transistor 72 is connected to receive the CLK signal after memory 46b via connection 80. Finally, the other source, drain of N type transistor 72 is supplied to the protrusion 24d.

Finally, block 20g contains a red LED 74 and a Green LED 76 which are connected to GND at one end. Another end of the red LED 74 is connected to the output of an inverter 78 whose input is connected to the green LED 76 and through the connection 80 to Vcc in block 20d.

In the operation of the blocks 20d and 20g, first it can be seen that if the user does not connect the connection 80, and if power is supplied to block 20g, i.e. block 20g is placed in a stack, then the input of inverter 78 is not connected to any source of power. Therefore, the output of the inverter 78 would be high, turning on the red LED 74. This condition continues until the connection 80 is made to a non-branching block 20, such as block 20d. When power is supplied through connection 80, the output of the inverter 78 is low, turning off the red LED 74. However, power supplied to the inverter 78 is also supplied to the green LED 76, turning it on. This signifies to the user that a "correct" (in so far as the block 20g requires a branch to block) connection is made.

In the operation of the blocks 20d and 20g, it is first assumed that block 20d is in one subroutine or stack and that block 20g is in another subroutine or stack as depicted in FIG. 3. If the stack containing the block 20d is read out, the clock signal CLK would be supplied from the block 20e below block 20d. The CLK signal is supplied to one of the inputs of the OR gate 70. The CLK signal is then used to clock out the data from memories 46a and 46b of block 20d. Although the data is supplied to both data bus 41 of block 20d and bus 41 of block 20g, since the CLK signal is supplied only to the stack containing block 20d, the data from receptacle 28c of the stack containing block 20g can be ignored by the computer 52. Alternatively, even if the same data is present on both data buses 41, that is inconsequential. After the CLK signal passes through the memory 46b, it is supplied to the source/drain of transistor 72 of block 20d. Since the gate of the N type transistor 72 of block 20d is also supplied with the same CLK signal from receptacle 28d, the CLK signal is passed through the transistor 72 to protrusion 24d, where it is supplied to the block 20c above block 20d. The CLK signal from memory 46b of block 20d, however, is also supplied through the connection 80 to the source/drain of transistor 72 of block 20g. However, since the gate of that transistor 72 is not supplied with any signal (the gate is supplied with a CLK signal from that stack which is not active), the signal is not passed to the protrusion 24d of block 20g.

If the stack containing the block 20g is read out the clock signal CLK would be supplied from the block 20h below block 20g. The CLK signal is supplied to the memory 46a and then to memory 46b where the data is read out and supplied to the bus 41 of block 20g. From memory 46b, the CLK signal is supplied to the connection 80 to block 20d to the other input of the OR gate 70. The CLK signal is then used to clock out the data from memories 46a and 46b of block 20d. As previously discussed, the data is supplied to both data bus 41 of block 20d and bus 41 of block 20g. After the CLK signal passes through the memory 46b of block 20d, it is supplied through the connection 80 back to block 20g to the source/drain of transistor 72. Since the gate of the N type transistor 72 of block 20g is also supplied with the same CLK signal from receptacle 28d, the CLK signal is passed through the transistor 72 to protrusion 24d, where it is supplied to the block 20f above block 20g. The CLK signal from memory 46b of block 20d, however, is also supplied to the source/drain of transistor 72 of block 20d. However, since the gate of that transistor 72 is not supplied with any signal (the gate is supplied with a CLK signal from that stack which is not active), the signal is not passed to the protrusion 24d of block 20d.

In accordance with the examples discussed above, the instructions read out from the stacks containing blocks 20g and 20d would be similar to the following:

| Subroutine 1 | | Subroutine 2 | |
|---|---|---|---|
| 00001 | Statement 1 | 00008 | Statement 8 |
| 00002 | Statement 2 | 00009 | Statement 9 |
| 00003 | Statement 3 | 00010 | Statement 10 |
| 00004 | (un)conditional branch to | 00011 | Statement 11 |
| 00010 | Statement 10 | | |
| 00005 | Statement 5 | | |

It is to be understood that the present invention is not limited to the embodiment(s) described above and illustrated herein, but encompasses any and all variations falling within the scope of the appended claims. For example, each of the blocks 20 need not have a plurality of protrusions/receptacles. The block may be stacked by only one protrusion/receptacle or by any other means without using any protrusion/receptacle. Further, the blocks 20 may be connected on surfaces other than a first surface and a second surface that are directly opposite to one another.

What is claimed is:

1. A stackable block comprising:
   a rigid member having a first surface with a protrusion thereon and a second surface having a receptacle;
   wherein said protrusion for mechanically stacking one stackable block to the receptacle of another stackable block, and said receptacle for receiving the protrusion of another stackable member;
   a memory for storage of at least one computer program instruction, wherein when a plurality of stackable blocks are mechanically stacked, a plurality of instructions are electrically connected forming a computer program, wherein the computer program is executed by a computer external to said block; and
   wherein said stackable block not having a computer.

2. The stackable block of claim 1 wherein said rigid member has a plurality of protrusions and a plurality of receptacles.

3. The stackable block of claim 2 wherein said first surface and said second surface are substantially opposite to one another.

4. The stackable block of claim 3 wherein said memory is a non-volatile memory for the storage of at least one instruction.

5. The stackable block of claim 4 wherein said non-volatile memory stores a plurality of instructions.

6. The stackable block of claim 4 wherein said non-volatile memory further stores a copyright protected work.

7. The stackable block of claim 4 wherein said non-volatile memory is electrically connected to said plurality of protrusions.

8. The stackable block of claim 4 wherein said non-volatile memory is electrically connected to said plurality of receptacles.

9. The stackable block of claim 3 wherein said rigid member is substantially rectilinearly shaped.

10. The stackable block of claim 2 wherein said plurality of protrusions and plurality of receptacles of each stackable block are asymmetrically shaped.

11. The stackable block of claim 1 further comprising:
a port for connecting to another stackable block;
wherein said another stackable block having a memory for storage of an (un)conditional branching computer program instruction; and
wherein said port for connecting to said (un)conditional branching computer program instruction.

12. The stackable block of claim 1 further comprising:
a port for connecting to another stackable block;
wherein said another stackable block having a memory for storage of a computer program instruction; and
wherein said port for connecting to said computer program instruction.

13. A computer system for a toy comprising:
a board having a first surface adapted to fit into a stack of one or more blocks each block having non-volatile memory for the storage of one or more computer program instructions forming a computer program with each block not having a computer therein; and
a computer, in said board, for receiving said computer program from said stack when said stack is fitted to said board, and for executing said computer program.

14. The computer system of claim 13 wherein said board having a plurality of protrusions on said first surface, said protrusions adapted to fit into said stack.

15. The computer system of claim 13 wherein said board having a plurality of receptacles on said first surface, said receptacles adapted to fit into said stack.

16. The computer system of claim 13 further comprising a compiler associated with said computer for compiling said computer program from said stack to generate a compiled computer program and for executing said compiled computer program.

17. The computer system of claim 13 further comprising an interpreter associated with said computer for interpreting said computer program from said stack to generate an interpreted computer program and for executing said interpreted computer program.

* * * * *